US011748595B2

(12) United States Patent
Yi

(10) Patent No.: US 11,748,595 B2
(45) Date of Patent: Sep. 5, 2023

(54) CONVOLUTION ACCELERATION OPERATION METHOD AND APPARATUS, STORAGE MEDIUM AND TERMINAL DEVICE

(71) Applicant: Shenzhen Intellifusion Technologies Co., Ltd., Guangdong (CN)

(72) Inventor: Liqiang Yi, Guangdong (CN)

(73) Assignee: Shenzhen Intellifusion Technologies Co., Ltd., Guangdong (CN)

( * ) Notice: Subject to any disclaimer, the term of this patent is extended or adjusted under 35 U.S.C. 154(b) by 0 days.

(21) Appl. No.: 17/623,886

(22) PCT Filed: Oct. 27, 2020

(86) PCT No.: PCT/CN2020/124097
§ 371 (c)(1),
(2) Date: Dec. 30, 2021

(87) PCT Pub. No.: WO2021/088688
PCT Pub. Date: May 14, 2021

(65) Prior Publication Data
US 2022/0366213 A1 Nov. 17, 2022

(30) Foreign Application Priority Data
Nov. 7, 2019 (CN) .......................... 201911082617.1

(51) Int. Cl.
*G06N 3/04* (2023.01)
*G06F 11/34* (2006.01)

(52) U.S. Cl.
CPC ........... *G06N 3/04* (2013.01); *G06F 11/3419* (2013.01); *G06F 11/3442* (2013.01)

(58) Field of Classification Search
None
See application file for complete search history.

(56) References Cited

U.S. PATENT DOCUMENTS

| 2015/0379430 | A1* | 12/2015 | Dirac | G06N 20/00 |
| | | | | 706/12 |
| 2016/0055426 | A1* | 2/2016 | Aminzadeh | G06N 7/01 |
| | | | | 706/12 |

(Continued)

FOREIGN PATENT DOCUMENTS

| CN | 109472361 A | 3/2019 |
| CN | 109740731 A | 5/2019 |

OTHER PUBLICATIONS

Meloni et al., ALOHA: an architectural-aware framework for deep learning at the edge; INTelligent Embedded Systems Architectures and Applications (INTESA), Oct. 4, 2018, Turin, Italy. ACM, New York, NY, USA; pp. 19-26 (Year: 2018).*

*Primary Examiner* — Alan Chen

(57) ABSTRACT

A convolution acceleration operation method and an apparatus, a storage medium and a terminal device are provided. The method includes: acquiring convolution parameters of a target convolution layer and device parameters of a target hardware equipment, wherein the target convolution layer is any convolution layer of a preset convolutional neural network, and the preset convolutional neural network is to be run in the target hardware equipment; according to the convolution parameters and device parameters, pre-estimating a running time of performing convolution operation on the target convolution layer in the target hardware equipment by using each preset acceleration algorithm; according to the running time, determining a target acceleration algorithm corresponding to the target convolution layer and target acceleration parameters corresponding to the target acceleration algorithm; and using the target acceleration algorithm and the target acceleration parameters corresponding to the target acceleration algorithm to perform convolution acceleration operation on the target convolution layer.

7 Claims, 5 Drawing Sheets

(56) References Cited

U.S. PATENT DOCUMENTS

2017/0091657 A1\* 3/2017 Kida ................. G06N 20/00
2017/0124486 A1\* 5/2017 Chan ................ G06F 16/2455
2017/0220942 A1\* 8/2017 Baldini Soares ...... G06N 20/00

\* cited by examiner

CONVOLUTION ACCELERATION OPERATION METHOD AND APPARATUS, STORAGE MEDIUM AND TERMINAL DEVICE

CROSS-REFERENCE TO RELATED APPLICATION

This application claims the benefit of priority from Chinese Patent Application No. 201911082617.1, entitled "CONVOLUTION ACCELERATION OPERATION METHOD AND APPARATUS, STORAGE MEDIUM AND TERMINAL DEVICE" and filed on Nov. 7, 2019, the content of which is hereby incorporated by reference in its entirety.

BACKGROUND

1. Technical Field

The present disclosure generally relates to the field of computers, and especially relates to a convolution acceleration operation method and an apparatus, a storage medium and a terminal device.

2. Description of Related Art

Convolutional Neural Networks (CNNs) are widely used in a plurality of fields, such as the fields of image recognition, video analysis, and natural language processing. However, due to high operation complexity of convolution layers in the CNN, the CNN is greatly limited to be used in some resource-constrained edge devices or end products. Furthermore, calculation of the CNN is mainly performed on the convolution layer, so that the CNN can be optimized and accelerated by performing convolution acceleration operation on the convolution layer thereof.

At present, a single convolution algorithm based on an FT transform or a Winograd minimum filtering is used to optimize and accelerate the convolution layers of the CNN, because performing convolution operation on the convolution layer is affected by differences of hardware resources of different hardware equipments or products, and structures of the convolution layers to be deployed, neither the convolution algorithm based on the FFT transformation nor the convolution algorithm based on the Winograd minimum filtering can reach good optimization and acceleration effect of the CNN.

SUMMARY

The technical problems to be solved: in view of the shortcomings of the related art, the present disclosure relates to a convolution acceleration operation method and an apparatus, a storage medium and a terminal device which can solve the problem that the conventional convolution acceleration operation method cannot enable the CNN to implement good optimization and acceleration effect integrally.

In a first aspect, a convolution acceleration operation method according to an embodiment of the present disclosure includes:

obtaining convolution parameters of a target convolution layer and equipment parameters of a target hardware equipment, wherein the target convolution layer is any convolution layer of a preset convolutional neural network, and the preset convolutional neural network is to be operated in the target hardware equipment;

pre-estimating a running time of performing convolution operation on the target convolution layer in the target hardware equipment by using each preset acceleration algorithm, according to the convolution parameters and the equipment parameters;

determining a target acceleration algorithm corresponding to the target convolution layer and target acceleration parameters corresponding to the target acceleration algorithm, according to the running time; and performing convolution acceleration operation on the target convolution layer by using the target acceleration algorithm and the target acceleration parameters corresponding to the target acceleration algorithm.

In a second aspect, a convolution acceleration operation apparatus according to an embodiment of the present disclosure includes:

a parameter obtaining module configured to obtain convolution parameters of a target convolution layer and equipment parameters of a target hardware equipment, wherein the target convolution layer is any convolution layer of a preset convolutional neural network, and the preset convolutional neural network is to be operated in the target hardware equipment;

a running time estimation module configured to pre-estimate a running time of performing convolution operation on the target convolution layer in the target hardware equipment by using each preset acceleration algorithm, according to the convolution parameters and the equipment parameters;

a target acceleration parameter determining module configured to determine a target acceleration algorithm corresponding to the target convolution layer and target acceleration parameters corresponding to the target acceleration algorithm, according to the running time; and a convolution acceleration operation module configured to perform convolution acceleration operation on the target convolution layer by using the target acceleration algorithm and the target acceleration parameters corresponding to the target acceleration algorithm.

In a third aspect, a terminal device according to an embodiment of the present disclosure includes a memory, a processor and computer programs stored in the memory and performed by the processor, when the computer programs are performed by the processor, the terminal device can be configured to implement steps of the convolution acceleration operation method above mentioned in the first aspect.

In a fourth aspect, a computer readable storage medium according to an embodiment of the present disclosure is configured to store computer programs performed by a processor to implement steps of the convolution acceleration operation method above mentioned in the first aspect.

In a fifth aspect, a computer program product according to an embodiment of the present disclosure is configured to be performed by a terminal device, when the computer program product is performed by a processor, the terminal device can be configured to implement steps of the convolution acceleration operation method above mentioned in the first aspect.

Compared with the related art, the present disclosure provides the advantages as below.

The present disclosure is provided that: firstly, obtaining convolution parameters of the target convolution layer and equipment parameters of the target hardware equipment, wherein the target convolution layer is any convolution layer in the preset convolutional neural network, and the preset convolutional neural network is to be operated in the target hardware equipment; secondly, pre-estimating the running time of performing convolution operation on the target convolution layer in the target hardware equipment by using each preset acceleration algorithm, according to the convolution parameters and the equipment parameters; thirdly, determining the target acceleration algorithm corresponding to the target convolution layer and target acceleration parameters corresponding to the target acceleration algorithm, according to the running time; and finally, performing convolution acceleration operation on the target convolution layer by using the target acceleration algorithm and the target acceleration parameters corresponding to the target acceleration algorithm. That is, in an embodiment of the present disclosure, the running time that each preset acceleration algorithm performs convolution operation on each target convolution layer can be estimated, according to the convolution parameters corresponding to each target convolution layer and the equipment parameters of the target hardware equipment; both the target acceleration algorithm corresponding to the target convolution layer, and the target acceleration parameters corresponding to the target acceleration algorithm can be determined according to the running time, so that a purpose that different convolution layers use different acceleration algorithms, can be achieved, the running time that the convolution operation is performed in the preset convolutional neural network, can be reduced to the maximum extent, thereby, overall optimization and acceleration effects of the preset convolutional neural network are optimal, and applications of the convolutional neural network in the edge equipments or the end products with limited resources can be further expanded.

BRIEF DESCRIPTION OF THE DRAWINGS

In order to more clearly understand the technical solution hereinafter in embodiments of the present disclosure, a brief description to the drawings used in detailed description of embodiments hereinafter is provided thereof. Obviously, the drawings described below are some embodiments of the present disclosure, for one of ordinary skill in the related art, other drawings can be obtained according to the drawings below on the premise of no creative work.

DETAILED DESCRIPTION

Figure 1:
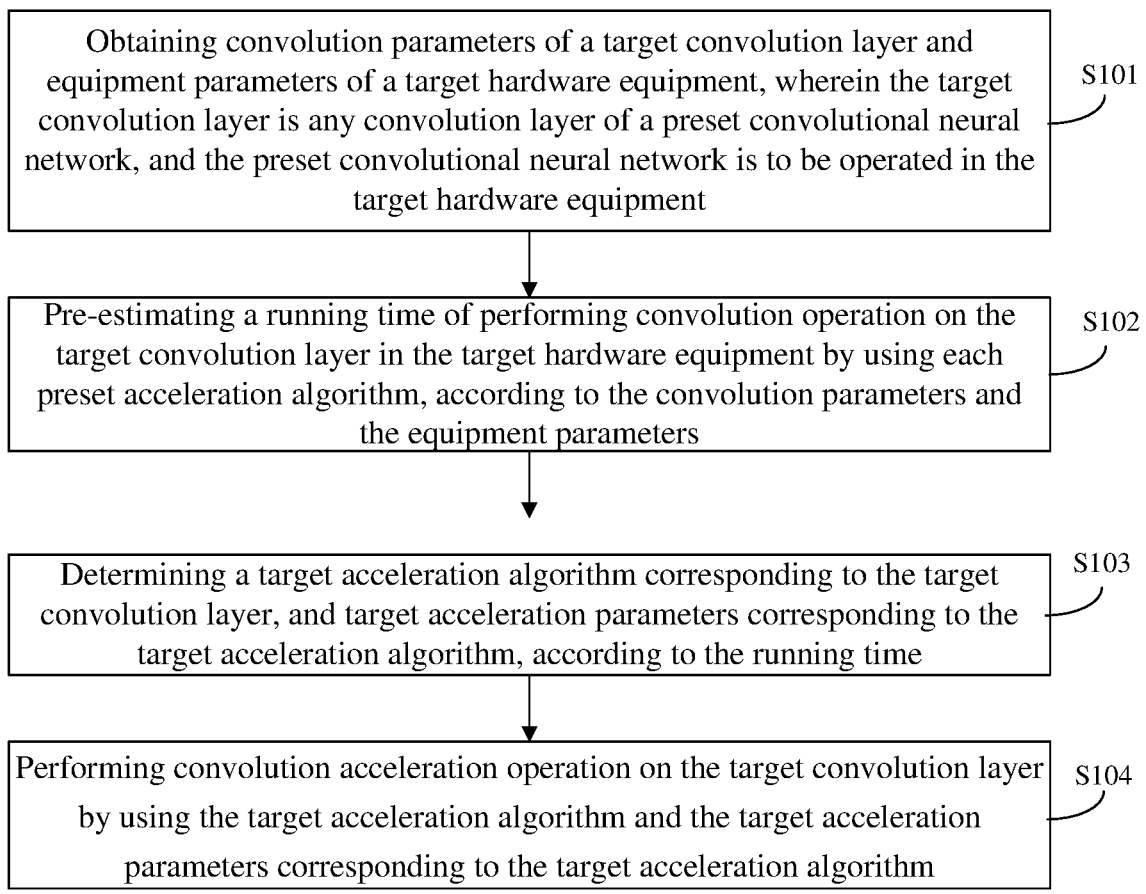
FIG. 1 is a flowchart of a convolution acceleration operation method in accordance with an embodiment of the present disclosure.

Referring to FIG. 1, a convolution acceleration operation method according to an embodiment of the present disclosure is provided, an execution subject of the embodiment of the present disclosure can be a terminal device, which includes, but is not limited to, computing devices such as a desktop computer, a notebook, a handheld computer and a cloud server. The convolution acceleration operation method can include:

step S101, obtaining convolution parameters of a target convolution layer and equipment parameters of a target hardware equipment, wherein the target convolution layer is any convolution layer of a preset convolutional neural network, and the preset convolutional neural network is to be operated in the target hardware equipment;

in an embodiment of the present disclosure, when a certain preset convolutional neural network needs to be deployed in a certain target hardware equipment for operation, the terminal device can identify each target convolution layer in the preset convolutional neural network, and extract the convolution parameters of each target convolution layer. The convolution parameters can include a number of input channels $C_i$, a height H and a width W of an input feature map, and a number of output channels $C_o$, a height KH and a width KW of a convolution kernel. At the same time, the terminal device can also obtain the equipment parameters of the target hardware equipment, for example, the equipment parameters of the target hardware equipment can be obtained by directly reading attribute information attached to the target hardware equipment, wherein the attribute information can include the equipment parameters of the target hardware equipment, or the equipment parameters of the target hardware equipment can be obtained through performing an operation test on the target hardware equipment, which is not limited in the embodiment of the present disclosure. The equipment parameters can include a peak memory bandwidth and a maximum operation amount per second of the target hardware equipment.

step S102, pre-estimating a running time of performing convolution operation on the target convolution layer in the target hardware equipment by using each preset acceleration algorithm, according to the convolution parameters and the equipment parameters;

for each target convolution layer, the running time of performing convolution operation on the target convolution layer in the target hardware equipment by using each preset acceleration algorithm can be estimated, according to the convolution parameters of the target convolution layer, and the equipment parameters. For example, the running time $TA_1$ that the preset acceleration algorithm A performs convolution operation on a first target convolution layer in the target hardware equipment can be estimated, according to the convolution parameter a of the first target convolution layer and the equipment parameters; the running time $TB_1$ that the preset acceleration algorithm B performs convolution operation on the first target convolution layer in the target hardware equipment can be estimated, according to the convolution parameter a of the first target convolution layer and the equipment parameters; the running time $TA_2$ that the preset acceleration algorithm A performs convolution operation on a second target convolution layer in the target hardware equipment can be estimated, according to the convolution parameter b of the second target convolution layer and the equipment parameters; and the running time $TB_2$ that the preset acceleration algorithm B performs convolution operation on the second target convolution layer in the target hardware equipment can be estimated, according to the convolution parameter b of the second target convolution layer and the equipment parameters, etc.

As an example rather than a limitation, the preset acceleration algorithm can include a conventional convolution algorithm corresponding to the preset convolutional neural network, a convolution algorithm based on an FFT transformation, a convolution algorithm based on an overlapping additive FFT transformation, and a convolution algorithm based on a Winograd minimum filtering, etc. In an embodiment of the present disclosure, the acceleration algorithms corresponding to different convolution layers can be comprehensively optimized and selected, according to hardware resources of the target hardware equipment and different structures of the convolution layer in the preset convolutional neural network, so that optimal performances of each acceleration algorithm in the target hardware equipment can be fully exerted, the running time that the convolution operation is performed in the preset convolutional neural network, can be reduced, and applications of the convolutional neural network in the hardware equipments with limited resources can be further expanded.

Figure 2:
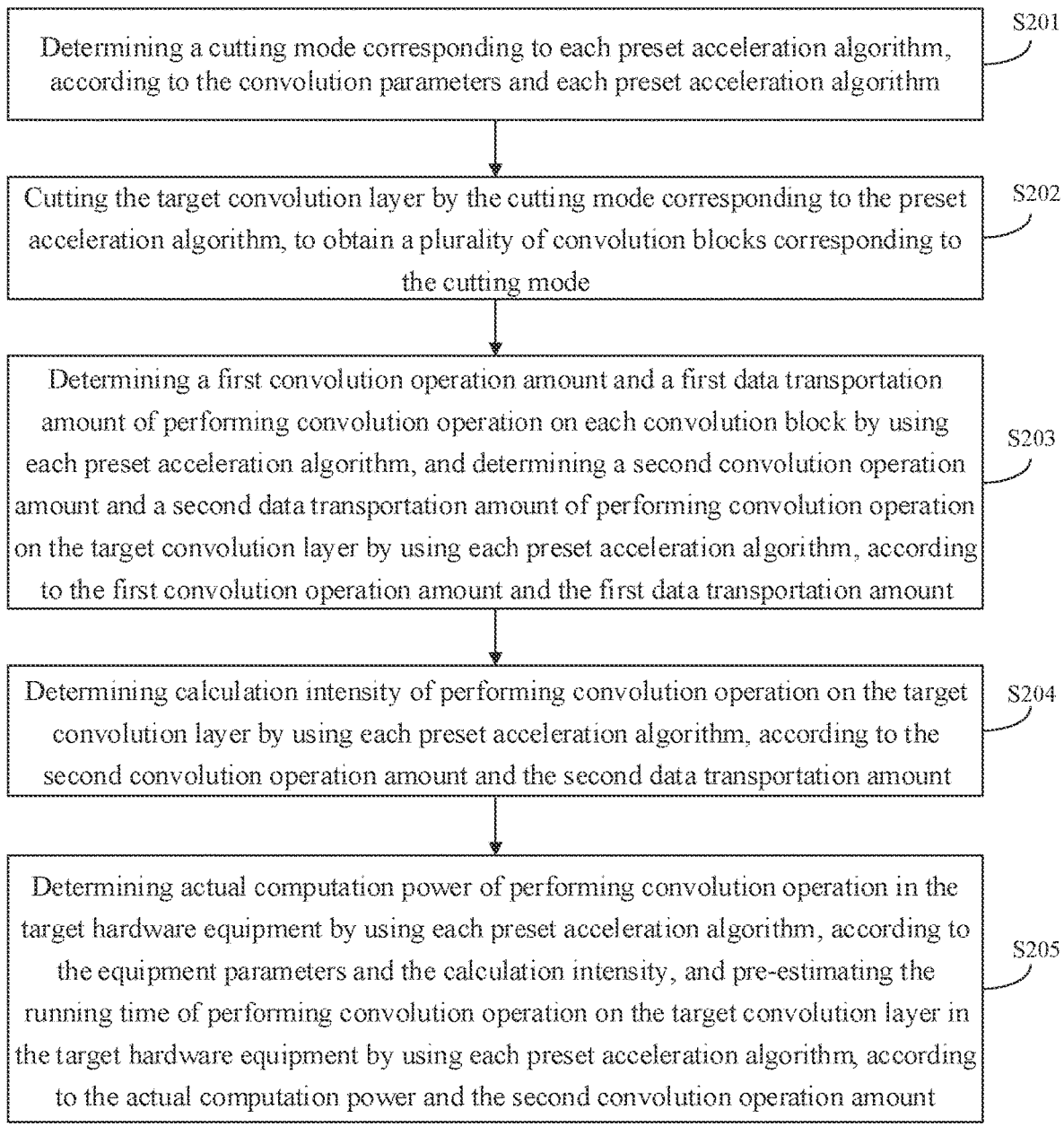
FIG. 2 is a flowchart of estimating a running time of the convolution acceleration operation method in an application scenario in accordance with an embodiment of the present disclosure.

In a possible implementation, referring to FIG. 2, the step of pre-estimating the running time of performing convolution operation on the target convolution layer in the target hardware equipment by using each preset acceleration algorithm, according to the convolution parameters and the equipment parameters, can include:

step S201, determining a cutting mode corresponding to each preset acceleration algorithm, according to the convolution parameters and each preset acceleration algorithm;

step S202, cutting the target convolution layer by using the cutting mode corresponding to the preset acceleration algorithm, to obtain a plurality of convolution blocks corresponding to the cutting mode;

for the above steps S201 and S202, cache resources of the target hardware equipment are limited, when each preset acceleration algorithm performs convolution operation on the target convolution layer in the target hardware equipment, in order to improve an operation efficiency of the convolution operation, the target convolution layer can be cut into the plurality of convolution blocks, and the convolution operation performed on the target convolution layer can be implemented by performing convolution operation on each convolution block.

First, an initial cutting mode corresponding to the target convolution layer can be determined, according to the convolution parameters of the target convolution layer, for example, the cutting mode corresponding to each parameter value can be determined, according to a value that each parameter value in the convolution parameters can be evenly divisible by the value. For example, when a convolution parameter Co of the convolution parameters is 16, Co can be cut according to five cutting modes of 1, 2, 4, 8 and 16. Furthermore, cutting Co according to a cutting mode of 1, means cutting Co into one part, i.e., cutting Co in a group of 16 output channels. Cutting Co according to a cutting mode of 2, means cutting Co into two parts, i.e., cutting Co in a group of 8 output channels. Cutting Co according to a cutting mode of 4, means cutting Co into four parts, that is, cutting Co in a group of 4 output channels, so does the rest cutting modes. And then, combining the cutting modes corresponding to the parameter values, to obtain the initial cutting mode corresponding to the target convolution layer, wherein the number of initial cutting modes is the product of the number of cutting modes corresponding to each parameter value. Finally, the initial cutting mode can be filtered according to operation requirements of the preset acceleration algorithm, to obtain the cutting mode corresponding to the preset acceleration algorithm.

Of course, the target convolution layer can be cut by using other cutting modes commonly used in the related art, which is not limited in the embodiment of the present disclosure.

step S203, determining a first convolution operation amount and a first data transportation amount of performing convolution operation on each convolution block by using each preset acceleration algorithm, and determining a second convolution operation amount and a second data transportation amount of performing convolution operation on the target convolution layer by using each preset acceleration algorithm, according to the first convolution operation amount and the first data transportation amount;

It should be noted that a convolution calculation amount (including the first convolution calculation amount and the second convolution calculation amount) can be measured by the number of operations, that is, it can be measured by a multiplication and addition operation amount in the convolution operation; and a data transportation amount (including the first data transportation amount and the second data transportation amount) can be measured by the sum of a memory occupied before and after the input feature map is converted, a memory occupied before and after the convolution kernel is converted, a memory occupied by the intermediate operation, and a memory occupied after the output feature map is converted. A multiplication and addition operation amount that each preset acceleration algorithm performs the convolution operation can be determined by a conventional statistical method. All the memory occupied before and after the input feature map is converted, the memory occupied before and after the convolution kernel is converted, the memory occupied by the intermediate operation, and the memory occupied after the output feature map is converted, in the convolution operation performed by each preset acceleration algorithm can also be determined by the conventional statistical method, which is not limited in the embodiment of the present disclosure.

At this point, the second convolution calculation amount that each preset acceleration algorithm performs convolution operation on the target convolution layer in each cutting mode is the cumulative sum of the first convolution calculation amount corresponding to each convolution block in the cutting mode, and an additional calculation amount between adjacent convolution blocks, wherein the additional calculation amount between adjacent convolution blocks can be 0. Similarly, the second data transportation amount that each preset acceleration algorithm performs convolution operation on the target convolution layer in each cutting mode is the cumulative sum of the first data transportation amount corresponding to each convolution block in the cutting mode. In particular, if data overlapping is formed in the input feature map during the operation of adjacent convolution blocks, the data that has overlapped is calculated only once during calculating the above-described cumulative sum. That is, after cutting the target convolution layer through a certain cutting mode corresponding to a certain preset acceleration algorithm, to obtain a plurality of convolution blocks corresponding to the target convolution layer, the preset acceleration algorithm can be configured to perform the same convolution operation on each convolution block, to obtain the first convolution calculation amount and the first data transportation amount corresponding to each convolution block, and then, the second convolution calculation amount that the preset acceleration algorithm performs convolution operation on the target convolution layer in the cutting mode can be further obtained by the first convolution calculation amount corresponding to each convolution block, at the same time, the second data transportation amount that the preset acceleration algorithm performs convolution operation on the target convolution layer in the cutting mode can be further obtained by the first data transportation amount corresponding to each convolution block.

It should be understood that, when the same preset acceleration algorithm cuts the target convolution layer by using different cutting modes, the second convolution calculation amount and the second data transportation amount of the target convolution layer obtained by performing convolution operation on the convolution block that has cut, can be different.

step S204, determining calculation intensity of performing convolution operation on the target convolution layer by using each preset acceleration algorithm, according to the second convolution operation amount and the second data transportation amount;

specifically, the step of determining the calculation intensity of performing convolution operation on the target convolution layer by using each preset acceleration algorithm, according to the second convolution operation amount and the second data transportation amount, can include:

the calculation intensity of performing convolution operation on the target convolution layer by using each preset acceleration algorithm is determined according to the following formula:

$$I_m^n = C_m^n / DM_m^n;$$

wherein, $I_m^n$ is a calculation intensity that an n-th cutting mode of an m-th preset acceleration algorithm performs convolution operation on the target convolution layer, $C_m^n$ is a second convolution calculation amount that the n-th cutting mode of the m-th preset acceleration algorithm performs convolution operation on the target convolution layer, $DM_m^n$ is a second data transportation amount that the n-th cutting mode of the m-th preset acceleration algorithm performs convolution operation on the target convolution layer, and in and n are integers greater than or equal to 0.

It should be noted that, when a certain preset acceleration algorithm including a plurality of cutting modes is configured to cut a certain target convolution layer, there are a plurality of calculation intensities that the preset certain acceleration algorithm performs convolution operation on the certain target convolution layer, that is, there can be a plurality of calculation intensities when performing convolution operation on the certain target convolution layer by using the same preset acceleration algorithm, and each calculation intensity corresponds to one cutting mode of the preset acceleration algorithm.

step S205, determining actual computation power of performing convolution operation in the target hardware equipment by using each preset acceleration algorithm, according to the equipment parameters and the calculation intensity, and pre-estimating the running time of performing convolution operation on the target convolution layer in the target hardware equipment by using each preset acceleration algorithm, according to the actual computation power and the second convolution operation amount.

In an embodiment of the present disclosure, the equipment parameters can include a peak memory bandwidth and a maximum operation amount per second of the target hardware equipment, wherein the maximum operation amount per second can be the maximum number of operations per second of the target hardware equipment.

The step of determining the actual computation power of performing convolution operation in the target hardware equipment by using each preset acceleration algorithm, according to the equipment parameters and the calculation intensity, can include: determining initial actual computation power of performing convolution operation in the target hardware equipment by using each preset acceleration algorithm, according to the peak memory bandwidth and the calculation intensity; and determining the actual computation power of performing convolution operation in the target hardware equipment by using each preset acceleration algorithm, according to the initial actual computation power and the maximum operation amount per second. The initial actual computation power equals to $\beta * I_m^n$, the actual computation power of performing convolution operation in the target hardware equipment by using each preset acceleration algorithm can be determined according to the following formula:

$$O_m^n = \min(O_p, \beta * I_m^n);$$

wherein $O_m^n$ is the actual computation power that the n-th cutting mode of the m-th preset acceleration algorithm performs convolution operation on the target hardware equipment, $O_p$ is the maximum operation amount per second, and $\beta$ is the peak memory bandwidth.

It should be noted that, when the certain preset acceleration algorithm including the plurality of cutting modes to cut the certain target convolution layer, there are a plurality of actual computation powers that the certain preset acceleration algorithm performs convolution operation on the certain target convolution layer, that is, each actual computation power corresponds to one cutting mode of the preset acceleration algorithm.

In a possible implementation, the step of pre-estimating the running time of performing convolution operation on the target convolution layer in the target hardware equipment by using each preset acceleration algorithm, according to the actual computation power and the second convolution operation amount, can include:

the running time of performing convolution operation on the target convolution layer in the target hardware equipment by using each preset acceleration algorithm, can be pre-estimated according to the following formula:

$$RT_m^n = C_m^n / O_m^n;$$

wherein, $RT_m^n$ is the running time that the n-th cutting mode of the m-th preset acceleration algorithm performs convolution operation on the target convolution layer in the target hardware equipment.

It should be noted that, when the certain preset acceleration algorithm including a plurality of cutting modes to cut the certain target convolution layer, there are a plurality of running times that the certain preset acceleration algorithm performs convolution operation on the certain target convolution layer, that is, each running time corresponds to one cutting mode of the preset acceleration algorithm.

step S103, determining a target acceleration algorithm corresponding to the target convolution layer and target acceleration parameters corresponding to the target acceleration algorithm, according to the running time;

In an embodiment of the present disclosure, the target acceleration algorithm is one of the preset acceleration algorithms, and the target acceleration parameter corresponding to the target acceleration algorithm is also one of the acceleration parameters of the preset acceleration algorithm, that is, for the same target convolution layer, the same preset acceleration algorithm can have a plurality of groups of acceleration parameters, and each group of acceleration parameters can correspond to one cutting mode in the preset acceleration algorithm. At this time, the acceleration parameters of the preset acceleration algorithm can be determined, according to the convolution parameters of the target convolution layer, and the cutting mode corresponding to the target convolution layer in the preset acceleration algorithm, that is, after determining the cutting mode corresponding to each preset acceleration algorithm, according to the convolution parameters and each preset acceleration algorithm, the method can include: configuring acceleration parameters corresponding to each preset acceleration algorithm, according to the convolution parameters and the cutting mode corresponding to each preset acceleration algorithm.

Specifically, each group of acceleration parameters in each preset acceleration algorithm can be composed of each cutting value after cutting each parameter value of the convolution parameters by using each cutting mode corresponding to each preset acceleration algorithm. For example, a first group of acceleration parameters in the preset acceleration algorithm A can be composed of each cutting value after cutting each parameter value of the convolution parameters by using a first cutting mode corresponding to the preset acceleration algorithm A; a second group of acceleration parameters in the preset acceleration algorithm A can be composed of each cutting value after cutting each parameter value of the convolution parameters by using a second cutting mode corresponding to the preset acceleration algorithm A; the first group of acceleration parameters in the preset acceleration algorithm B can be composed of each cutting value after cutting each parameter value of the convolution parameters by using the first cutting mode corresponding to the preset acceleration algorithm B, and so on.

In a specific application, when it is determined that the parameter value Co of the convolution parameters in the target convolution layer a can be cut by using five cutting modes, i.e., 1, 2, 4, 8 and 16, corresponding to the preset acceleration algorithm A, then, after cutting Co according to the first cutting mode of 1, the cutting value corresponding to Co is 16, so, Co of the first group of acceleration parameters corresponding to the first cutting mode in the preset acceleration algorithm A is 16; after cutting Co according to the second cutting mode of 2, the cutting value corresponding to Co is 8, so, Co of the second group of acceleration parameters corresponding to the second cutting mode in the preset acceleration algorithm A is 8; after cutting Co according to the third cutting mode of 4, the cutting value corresponding to Co is 4, so, Co of the third group of acceleration parameters corresponding to the third cutting mode in the preset acceleration algorithm A is 4, and so on, the cutting values corresponding to other parameter values of the convolution parameters can be determined according to the cutting modes.

Figure 3:
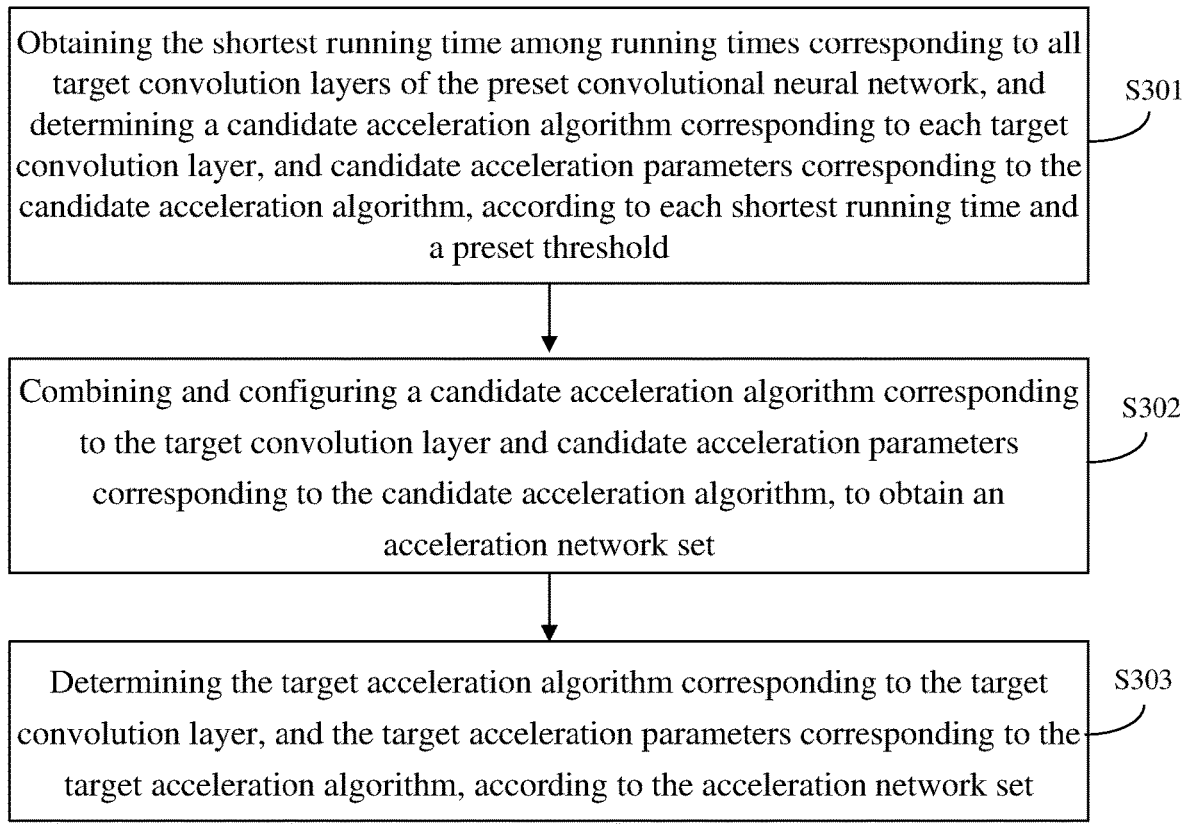
FIG. 3 is a flowchart of determining target acceleration parameters by the convolution acceleration operation method in the application scenario in accordance with an embodiment of the present disclosure.

In a possible implementation, referring to FIG. 3, the step of determining the target acceleration algorithm corresponding to the target convolution layer and the target acceleration parameters corresponding to the target acceleration algorithm, according to the running time, can include:

step S301, obtaining the shortest running time among the running times corresponding to all target convolution layers of the preset convolutional neural network, and determining a candidate acceleration algorithm corresponding to each target convolution layer and candidate acceleration parameters corresponding to the candidate acceleration algorithm, according to each shortest running time and a preset threshold;

in an embodiment of the present disclosure, the shortest running time corresponding to any target convolution layer is: $RT_{min}^s = \min{0 \le m \le M}_{0 \le n \le N}\{RT_m^{s,n}\}$; wherein, $RT_{min}^s$ is the shortest running time corresponding to an s-th target convolution layer, $RT_m^{s,n}$ is the running time that the s-th target convolution layer is cut by the n-th cutting mode of the m-th preset acceleration algorithm, and then is performed convolution operation, M is the number of preset acceleration algorithms, and N is the number of cutting modes that the m-th preset acceleration algorithm cuts the s-th target convolution layer.

It should be understood that the preset threshold T can be determined according to specific situations, for example, the preset threshold T can be empirically determined to be 1.1, 1.2, or any other values. The preset thresholds T corresponding to each target convolution layer can be the same or different.

In a possible implementation, the step of determining the candidate acceleration algorithm corresponding to each target convolution layer, and the candidate acceleration parameters corresponding to the candidate acceleration algorithm, according to each shortest running time and the preset threshold, can include: obtaining a target running time satisfying preset conditions among the running time of each target convolution layer, each shortest running time and the preset threshold; and determining the preset acceleration algorithm and the acceleration parameter that respectively correspond to each target running time, as the candidate acceleration algorithm corresponding to each target convolution layer, and the candidate acceleration parameter corresponding to the candidate acceleration algorithm. For example, the preset acceleration algorithm and the acceleration parameter respectively corresponding to the target running time satisfying the following formula among the running time in each target convolution layer, the shortest running time and the preset threshold, are respectively determined as the candidate acceleration algorithm corresponding to each target convolution layer and the candidate acceleration parameters corresponding to the candidate acceleration algorithm;

$$\frac{RT_m^{s,n}}{RT_{min}^s} \le T;$$

wherein, $RT_m^{s,n}$ is the running time that the n-th cutting mode in the m-th preset acceleration algorithm performs convolution operation on the s-th target convolution layer, $RT_{min}^s$ is the shortest running time corresponding to the s-th target convolution layer.

It should be understood that the candidate acceleration algorithm is one or more of the preset acceleration algorithms, the candidate acceleration parameters corresponding to the candidate acceleration algorithm is one or more of the acceleration parameters of the preset acceleration algorithm, and each kind of acceleration parameters corresponds to one cutting mode. An increase in the number of candidate configuration groups (i.e., a combination of a candidate acceleration algorithm and a group of candidate acceleration parameters in the candidate acceleration algorithm) corresponding to any target convolution layer will increase the number of subsequent running tests on the preset convolutional neural network exponentially. Therefore, in order to reduce the number of running tests and improve efficiency of determining the target acceleration algorithm corresponding to each target convolution layer in the preset convolutional neural network, in an embodiment of the present disclosure, only one candidate configuration group can be reserved for the same candidate acceleration algorithm, that is, the only one candidate configuration group can be reserved to satisfy the condition:

$$\min_{0 \le n < N} \{RT_m^{s,n}\} / RT_{min}^s \le T.$$

That is to say, for the s-th target convolution layer, when a plurality of groups of acceleration parameters that satisfy the condition of $$\frac{RT_m^{s,n}}{RT_{min}^s} \le T$$

is occurred in the m-th preset acceleration algorithm, only a combination of the acceleration parameters corresponding to the minimum $RT_m^{s,n}$, and the m-th preset acceleration algorithm is determined as a candidate configuration group of the s-th target convolution layer, so as to reduce the number of candidate configuration groups related to the m-th preset acceleration algorithm.

step S302, combining and configuring the candidate acceleration algorithm corresponding to the target convolution layer, and the candidate acceleration parameter corresponding to the candidate acceleration algorithm, to obtain an acceleration network set;

At this point, the candidate acceleration algorithm and one group of candidate acceleration parameters in the candidate acceleration algorithm can be combined into a group of candidate configuration groups. In an embodiment of the present disclosure, there can be one or more candidate configuration groups corresponding to each target convolution layer, so that the overall running time of the preset convolutional neural network can be different, during selecting different candidate configuration groups for each target convolution layer. Therefore, in order to ensure that the overall running time of the preset convolutional neural network is minimal, the candidate configuration groups corresponding to each target convolution layer can be configured in a combination manner, to obtain the acceleration network set corresponding to the preset convolutional neural network. Each element of the acceleration network set (i.e., a subsequent acceleration network group) can correspond to a complete candidate configuration in the preset convolutional neural network, wherein the complete candidate configuration indicates that a corresponding candidate configuration group is configured for each target convolution layer.

For example, when a certain preset convolutional neural network includes three convolution layers, wherein, when a first convolution layer has one candidate configuration group, a second convolution layer has two candidate configuration groups, and a third convolution layer has two candidate configuration groups, the acceleration network set corresponding to the certain preset convolutional neural network obtained by combination can include four elements, wherein a first element can be {the candidate configuration group of the first convolution layer, the first candidate configuration group of the second convolution layer, and the first candidate configuration group of the third convolution layer}; the second element can be {the candidate configuration group of the first convolution layer, the first candidate configuration group of the second convolution layer, and the second candidate configuration group of the third convolution layer}; the third element can be {the candidate configuration group of the first convolution layer, the second candidate configuration group of the second convolution layer, and the first candidate configuration group of the third convolution layer}; the fourth element can be {the candidate group of the first convolution layer, the second candidate group of the second convolution layer, and the second candidate group of the third convolution layer}.

Step S303, determining the target acceleration algorithm corresponding to the target convolution layer, and the target acceleration parameters corresponding to the target acceleration algorithm, according to the acceleration network set.

Figure 4:
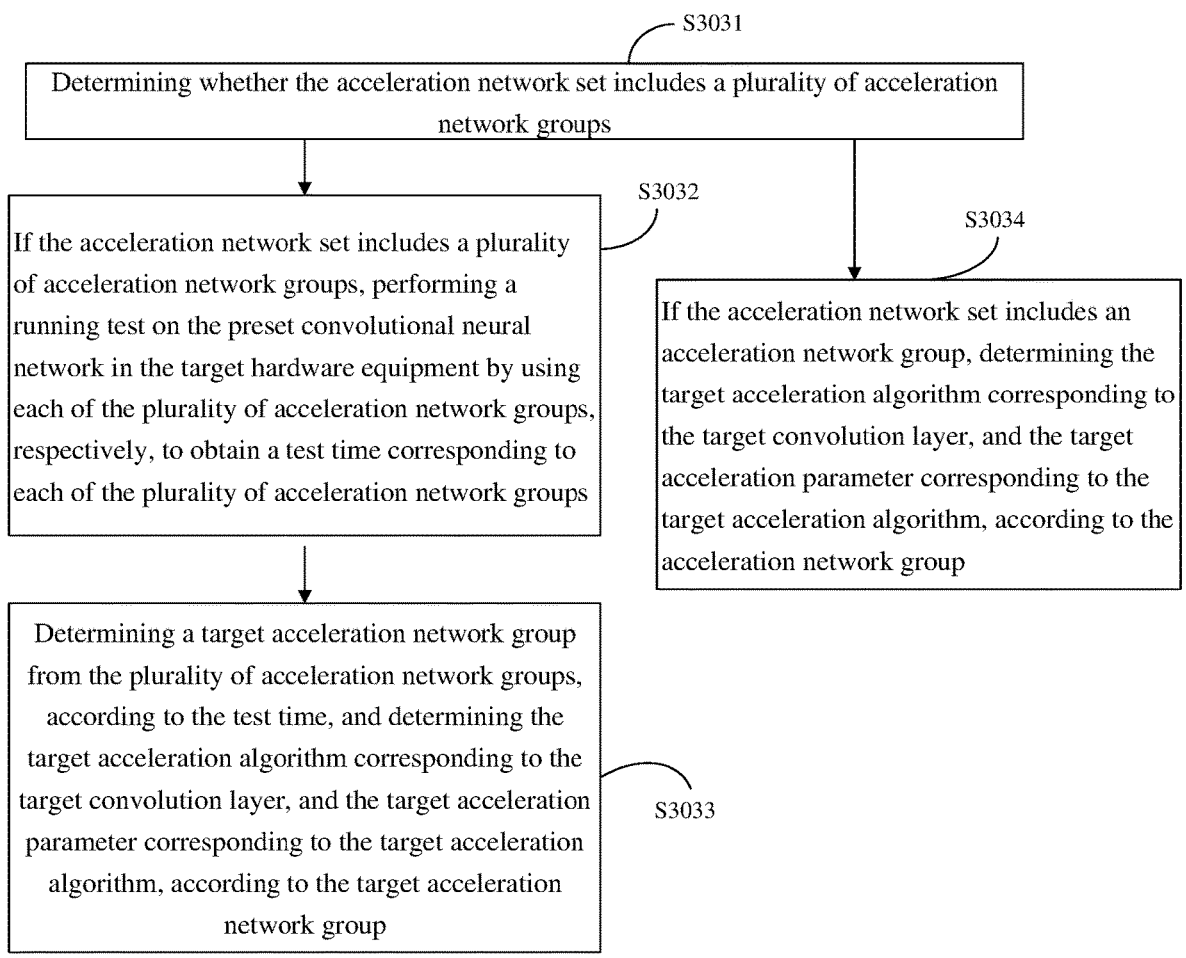
FIG. 4 is similar to FIG. 3, but shown in another application scenario.

Specifically, referring to FIG. 4, the step of determining the target acceleration algorithm corresponding to the target convolution layer, and the target acceleration parameters corresponding to the target acceleration algorithm, according to the acceleration network set, can include:

step S3031, determining whether the acceleration network set includes a plurality of acceleration network groups;

step S3032, if the acceleration network set includes a plurality of acceleration network groups, performing a running test on the preset convolutional neural network in the target hardware equipment by using each of the plurality of acceleration network groups, respectively, to obtain a test time corresponding to each of the plurality of acceleration network groups;

step S3033, determining a target acceleration network group from the plurality of acceleration network groups, according to the test time, and determining the target acceleration algorithm corresponding to the target convolution layer, and the target acceleration parameters corresponding to the target acceleration algorithm, according to the target acceleration network group;

For the above steps S3031-S3033, when the acceleration network set includes the plurality of acceleration network groups, in order to determine an optimal acceleration network group, a convolution operation test can be performed on the preset convolutional neural network in the target hardware equipment by using each candidate acceleration algorithm in each acceleration network group, and candidate acceleration parameters corresponding to each candidate acceleration algorithm, so as to obtain a test time corresponding to each acceleration network group, and then, the optimal acceleration network group (i.e., the above target acceleration network group) corresponding to the preset convolutional neural network can be determined, according to the test time. Specifically, the acceleration network group with the shortest test time can be determined as the target acceleration network group corresponding to the preset convolutional neural network, and the candidate acceleration algorithm and corresponding candidate acceleration parameters of each candidate configuration group in the target acceleration network group can be determined as the target acceleration algorithm and the target acceleration parameters of the target convolution layer corresponding to each candidate configuration group.

step S3034, if the acceleration network set includes an acceleration network group, determining the target acceleration algorithm corresponding to the target convolution layer, and the target acceleration parameters corresponding to the target acceleration algorithm, according to the acceleration network group.

It should be understood that, when the acceleration network set only includes one acceleration network group, the candidate acceleration algorithm and the corresponding candidate acceleration parameters of each candidate configuration group in the acceleration network group, can be directly determined as the target acceleration algorithm, and the target acceleration parameters of the target convolution layer corresponding to each candidate configuration group.

Step S104, performing convolution acceleration operation on the target convolution layer by using the target acceleration algorithm and the target acceleration parameters corresponding to the target acceleration algorithm.

It should be understood that, after the target acceleration algorithm and the target acceleration parameters corresponding to each target convolutional layer in the preset convolutional neural network are obtained, when the convolution operation is performed on the preset convolutional neural network in the target hardware equipment, the target acceleration algorithm and the target acceleration parameters corresponding to each target convolution layer can be directly configured to perform convolution acceleration operation on each target convolution layer, so as to reduce the running time that the convolution operation is performed on the preset convolutional neural network, and improve operation efficiency of the convolution operation.

The present disclosure is provided that: firstly, obtaining convolution parameters of the target convolution layer and equipment parameters of the target hardware equipment, wherein the target convolution layer is any convolution layer in the preset convolutional neural network, and the preset convolutional neural network is to be operated in the target hardware equipment; secondly, pre-estimating the running time of performing convolution operation on the target convolution layer in the target hardware equipment by using each preset acceleration algorithm, according to the convolution parameters and the equipment parameters; thirdly, determining the target acceleration algorithm corresponding to the target convolution layer and target acceleration parameters corresponding to the target acceleration algorithm, according to the running time; and finally, performing convolution acceleration operation on the target convolution layer by using the target acceleration algorithm and the target acceleration parameters corresponding to the target acceleration algorithm. That is, in an embodiment of the present disclosure, the running time that each preset acceleration algorithm performs convolution operation on each target convolution layer can be estimated, according to the convolution parameters corresponding to each target convolution layer and the equipment parameters of the target hardware equipment; both the target acceleration algorithm corresponding to the target convolution layer, and the target acceleration parameters corresponding to the target acceleration algorithm can be determined according to the running time, so that a purpose that different convolution layers use different acceleration algorithms, can be achieved, the running time that the convolution operation is performed in the preset convolutional neural network, can be reduced to the maximum extent, thereby, overall optimization and acceleration effects of the preset convolutional neural network are optimal, and applications of the convolutional neural network in the edge equipments or the end products with limited resources can be further expanded.

It should be understood that sequence numbers of the steps in the above embodiments do not imply orders to be performed, sequences to perform each process shall be determined by its functions and internal logics, rather than to constitute any limitations to perform the embodiments of the present disclosure.

Figure 5:
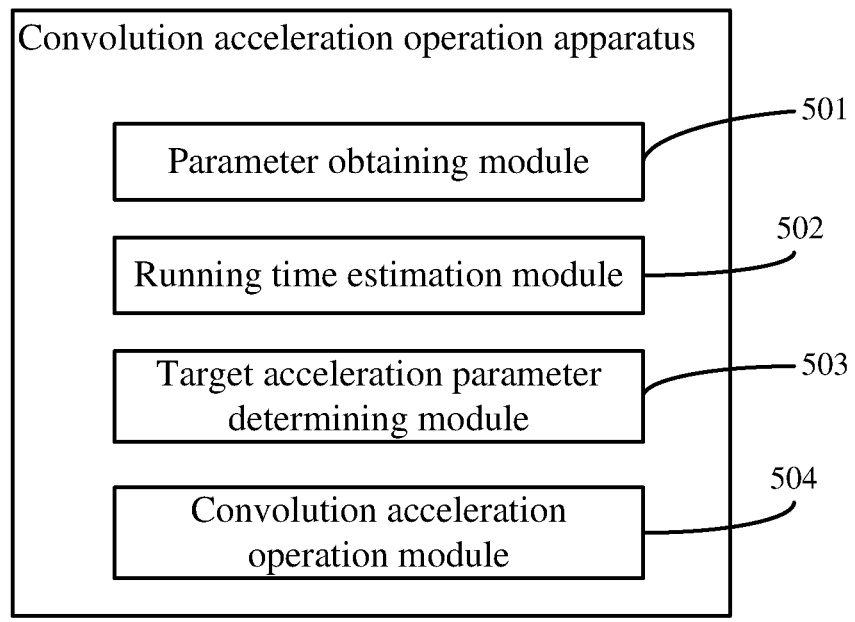
FIG. 5 is a block diagram of a convolution acceleration operation apparatus in accordance with an embodiment of the present disclosure.

Corresponding to the above convolution acceleration operation method, FIG. 5 is a block diagram of a convolution acceleration operation apparatus according to an embodiment of the present disclosure, and only shows parts relevant to the embodiment of the present disclosure for convenience illustration.

Referring to FIG. 5, the convolution acceleration operation apparatus, can include:

a parameter obtaining module 501 configured to obtain convolution parameters of a target convolution layer and equipment parameters of a target hardware equipment, wherein the target convolution layer is any convolution layer of a preset convolutional neural network, and the preset convolutional neural network is to be operated in the target hardware equipment;

a running time estimation module 502 configured to pre-estimate a running time of performing convolution operation on the target convolution layer in the target hardware equipment by using each preset acceleration algorithm, according to the convolution parameters and the equipment parameters;

a target acceleration parameter determining module 503 configured to determine a target acceleration algorithm corresponding to the target convolution layer, and target acceleration parameters corresponding to the target acceleration algorithm, according to the running time; and a convolution acceleration operation module 504 configured to perform convolution acceleration operation on the target convolution layer by using the target acceleration algorithm and the target acceleration parameters corresponding to the target acceleration algorithm.

In a possible implementation, the running time estimation module 502 can include:

a cutting mode determining unit configured to determine a cutting mode corresponding to each preset acceleration algorithm, according to the convolution parameters and each preset acceleration algorithm;

a cutting unit configured to cut the target convolution layer by using the cutting mode corresponding to the preset acceleration algorithm, to obtain a plurality of convolution blocks corresponding to the cutting mode;

a calculation amount determining unit configured to determine a first convolution operation amount and a first data transportation amount of performing convolution operation on each convolution block by using each preset acceleration algorithm, and determine a second convolution operation amount and a second data transportation amount of performing convolution operation on the target convolution layer by using each preset acceleration algorithm, according to the first convolution operation amount and the first data transportation amount;

a calculation intensity determining unit configured to determine calculation intensity of performing convolution operation on the target convolution layer by using each preset acceleration algorithm, according to the second convolution operation amount and the second data transportation amount; and a running time pre-estimating unit configured to determine actual computation power of performing convolution operation in the target hardware equipment by using each preset acceleration algorithm, according to the equipment parameters and the calculation intensity, and pre-estimate the running time of performing convolution operation on the target convolution layer in the target hardware equipment by using each preset acceleration algorithm, according to the actual computation power and the second convolution operation amount.

In a possible implementation, the equipment parameters includes a peak memory bandwidth and a maximum operation amount per second;

the running time pre-estimating unit can include:

an initial actual computation power determining subunit configured to determine initial actual computation power of performing convolution operation in the target hardware equipment by using each preset acceleration algorithm, according to the peak memory bandwidth and the calculation intensity; and an actual computation power determining subunit configured to determine the actual computation power of performing convolution operation in the target hardware equipment by using each preset acceleration algorithm, according to the initial actual computation power and the maximum operation amount per second.

In a possible implementation, the convolution acceleration operation apparatus, further can include:

an acceleration parameter configuration module configured to configure acceleration parameters corresponding to each preset acceleration algorithm, according to the convolution parameters and the cutting mode corresponding to each preset acceleration algorithm;

accordingly, the target acceleration parameter determining module 503 can include:

a candidate acceleration parameter determining unit configured to obtain the shortest running time among the running times corresponding to all target convolution layers of the preset convolutional neural network, and determine a candidate acceleration algorithm corresponding to each target convolution layer, and candidate acceleration parameters corresponding to the candidate acceleration algorithm, according to each shortest running time and a preset threshold;

a candidate acceleration parameter combination unit configured to combine and configure the candidate acceleration algorithm corresponding to the target convolution layer, and the candidate acceleration parameters corresponding to the candidate acceleration algorithm, to obtain an acceleration network set; and a target acceleration parameter determining unit configured to determine the target acceleration algorithm corresponding to the target convolution layer, and the target acceleration parameters corresponding to the target acceleration algorithm, according to the acceleration network set.

Specifically, the target acceleration parameter determining unit can include:

a running test subunit configured to: if the acceleration network set includes a plurality of acceleration network groups, perform a running test on the preset convolutional neural network in the target hardware equipment by using each of the plurality of acceleration network groups, respectively, to obtain a test time corresponding to each of the plurality of acceleration network groups;

a first target acceleration parameter determining subunit configured to determine a target acceleration network group from the plurality of acceleration network groups, according to the test time, and determine the target acceleration algorithm corresponding to the target convolution layer, and the target acceleration parameters corresponding to the target acceleration algorithm, according to the target acceleration network group;

a second target acceleration parameter determining subunit configured to: if the acceleration network set includes an acceleration network group, determine the target acceleration algorithm corresponding to the target convolution layer, and the target acceleration parameters corresponding to the target acceleration algorithm, according to the acceleration network group.

Optionally, the candidate acceleration parameter determining unit can include:

a target running time obtaining subunit configured to obtain a target running time satisfying preset conditions among the miming time of each target convolution layer, each shortest running time and the preset threshold; and a candidate acceleration parameter determining subunit configured to determine the preset acceleration algorithm and the acceleration parameters that respectively correspond to each target running time, as the candidate acceleration algorithm corresponding to each target convolution layer, and the candidate acceleration parameters corresponding to the candidate acceleration algorithm.

It should be noted that information interaction and execution processes between the above devices/units are based on the same conception as the embodiments of the present disclosure, therefore, specific functions and technical effects brought by the above devices/units can be detailed in the embodiments of the present method, which is not be repeated here.

An ordinary skilled person in the art can be clearly understood that: for convenient and simple description, the above functional units and modules are only divided to illustrate with examples. In a practical application, different functional units and modules can be assigned to implement the above functions according to needs, that is, internal structures of the apparatus can be divided into different functional units or modules to complete all or part of the functions described above. Each functional unit or each module in embodiments of the present disclosure can be integrated in a processing unit, or each unit can be physically existed separately, or two or more units can be integrated in a unit. The above-mentioned integrated units can be realized in the form of hardware or software functional units. In addition, specific names of each functional unit and each module are only to conveniently distinguish with each other, but are not limited to the protection scope of the present disclosure. A specific working process of the units and modules in the above system can be referred to the corresponding process in the embodiment of the above method, which is not repeated here.

Figure 6:
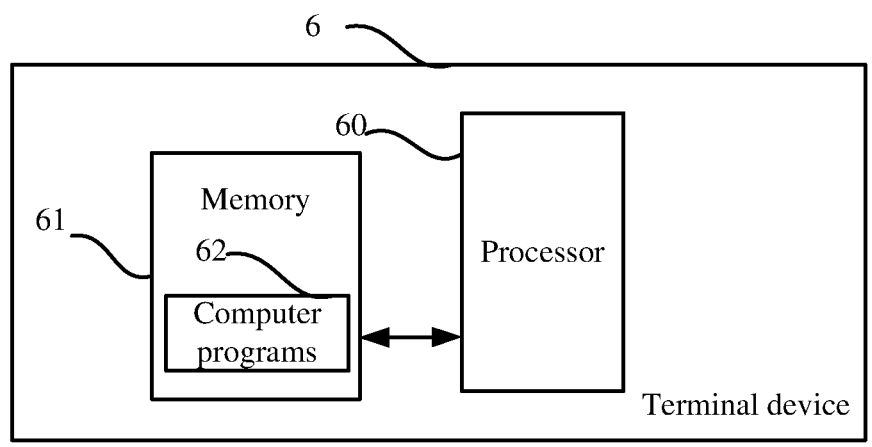
FIG. 6 is a block diagram of a terminal device in accordance with an embodiment of the present disclosure.

FIG. 6 is a schematic diagram of a terminal device in accordance with an embodiment of the present disclosure. Referring to FIG. 6, the terminal device 6 includes: at least one processor 60 (only one is shown is FIG. 6), a memory 61 and computer programs 62 stored in the memory 61 and performed by the at least one processor 60 to implement steps of the convolution acceleration operation method mentioned above.

The terminal device 6 can be a computing device such as a desktop computer, a notebook, a handheld computer and a cloud server. The terminal device 6 can include, but not limited to, the processor 60 and the memory 61. An ordinary skilled person in the art can be understood that: FIG. 6 is only an example of the terminal device 6, but not limited to include more or less components shown in FIG. 6, or some combination of components, or different components. For example, the terminal device 6 can also include input/output devices, network access devices etc.

The processor 60 can be a Central Processing Unit (CPU), other general-purpose processors, a Digital Signal Processor (DSP), an Application Specific Integrated Circuit (ASIC), a Field-Programmable Gate Array (FPGA) or other programmable logic devices, discrete gates or transistor logic devices, discrete hardware components, etc. The general-purpose processor can be a microprocessor or any conventional processors, etc.

In some embodiments, the memory 61 can be an internal storage unit within the terminal equipment 6, such as a hard disk or a memory of the terminal equipment 6. In other embodiments, the memory 61 can also be an external storage device of the terminal equipment 6, such as a plug-in hard disk, a Smart Media Card (SMC), a Secure Digital (SD) Card, and a Flash Card, etc. equipped on the terminal equipment 6. Furthermore, the memory 61 can also include both an internal storage unit thereof and an external storage device. The memory 61 is configured to store operation systems, application programs, Bootloader, data, and other programs, such as program codes of computer programs, and temporarily store data that has been output or to be output.

A computer readable storage medium according to an embodiment of the present disclosure is configured to store computer programs, when the computer programs are performed by a processor, the terminal equipment can be configured to implement steps of the convolution acceleration operation method above mentioned.

A computer program product according to an embodiment of the present disclosure is provided and performed by the terminal equipment to implement steps of the convolution acceleration operation method mentioned above.

The integrated units can be stored in a computer readable memory if implemented in the form of software program modules and sold or used as a separate product. Based on this understanding, all or part of the steps in the method of the above embodiment in the present disclosure can be implemented by computer program instructions of relevant hardware which can be stored in a computer readable storage medium, the computer program can be performed by the processor to implement the steps in the various methods of the above embodiments. Furthermore, the computer program includes computer program codes, which can be in a form of source codes, object codes, executable files or some intermediate forms, etc. The computer readable medium can include: any entities or devices capable of carrying the computer program codes to the devices/terminal devices, a recording medium, a computer Memory, a Read-Only Memory (ROM), a Random Access Memory (RAM), an electrical carrier signal, a telecommunication signal, and a software distribution medium such as a U disk, a mobile hard disk drive, a diskette or a CD. In some jurisdictions, in accordance with legislation and patent practice, computer readable storage medium do not include electrical carrier signals and telecommunications signals.

What is claimed is:

1. A convolution acceleration operation method comprising:
   obtaining convolution parameters of a target convolution layer and equipment parameters of a target hardware equipment, wherein the target convolution layer is any convolution layer of a preset convolutional neural network, and the preset convolutional neural network is to be operated in the target hardware equipment;
   pre-estimating a running time of performing convolution operation on the target convolution layer in the target hardware equipment by using each of a plurality of preset acceleration algorithms, according to the convolution parameters and the equipment parameters;
   determining a target acceleration algorithm corresponding to the target convolution layer and target acceleration parameters corresponding to the target acceleration algorithm, according to the running time; and
   performing convolution acceleration operation on the target convolution layer by using the target acceleration algorithm and the target acceleration parameters corresponding to the target acceleration algorithm;
   wherein the step of pre-estimating the running time of performing convolution operation on the target convolution layer in the target hardware equipment by using each of the plurality of preset acceleration algorithms, according to the convolution parameters and the equipment parameters, comprises:
   determining a cutting mode corresponding to each of the plurality of preset acceleration algorithms, according to the convolution parameters and each of the plurality of preset acceleration algorithms;
   cutting the target convolution layer by using the cutting mode corresponding to each of the plurality of preset acceleration algorithms, to obtain a plurality of convolution blocks corresponding to the cutting mode;
   determining a first convolution operation amount and a first data transportation amount of performing convolution operation on each convolution block by using each of the plurality of preset acceleration algorithms, and determining a second convolution operation amount and a second data transportation amount of performing convolution operation on the target convolution layer by using each of the plurality of preset acceleration algorithms, according to the first convolution operation amount and the first data transportation amount;
   determining calculation intensity of performing convolution operation on the target convolution layer by using each of the plurality of preset acceleration algorithms, according to the second convolution operation amount and the second data transportation amount; and
   determining actual computation power of performing convolution operation in the target hardware equipment by using each of the plurality of preset acceleration algorithms, according to the equipment parameters and the calculation intensity, and pre-estimating the running time of performing convolution operation on the target convolution layer in the target hardware equipment by using each of the plurality of preset acceleration algorithms, according to the actual computation power and the second convolution operation amount.

2. The convolution acceleration operation method as claimed in claim 1, wherein the equipment parameters comprises a peak memory bandwidth and a maximum operation amount per second;
   the step of determining actual computation power of performing convolution operation in the target hardware equipment by using each of the plurality of preset acceleration algorithms, according to the equipment parameters and the calculation intensity, comprising:
   determining initial actual computation power of performing convolution operation in the target hardware equipment by using each of the plurality of preset acceleration algorithms, according to the peak memory bandwidth and the calculation intensity; and
   determining the actual computation power of performing convolution operation in the target hardware equipment by using each of the plurality of preset acceleration algorithms, according to the initial actual computation power and the maximum operation amount per second.

3. The convolution acceleration operation method as claimed in claim 2, wherein after determining the cutting mode corresponding to each of the plurality of preset acceleration algorithms, according to the convolution parameters and each of the plurality of preset acceleration algorithms, the method comprises:

configuring acceleration parameters corresponding to each of the plurality of preset acceleration algorithms, according to the convolution parameters and the cutting mode corresponding to each of the plurality of preset acceleration algorithms;

the step of determining the target acceleration algorithm corresponding to the target convolution layer, and the target acceleration parameters corresponding to the target acceleration algorithm, according to the running time, comprising:

obtaining the shortest running time among the running times corresponding to all target convolution layers in the preset convolutional neural network, and determining a candidate acceleration algorithm corresponding to each target convolution layer, and candidate acceleration parameters corresponding to the candidate acceleration algorithm, according to each shortest running time and a preset threshold;

combining and configuring the candidate acceleration algorithm corresponding to the target convolution layer, and the candidate acceleration parameters corresponding to the candidate acceleration algorithm, to obtain an acceleration network set; and determining the target acceleration algorithm corresponding to the target convolution layer, and the target acceleration parameters corresponding to the target acceleration algorithm, according to the acceleration network set.

4. The convolution acceleration operation method as claimed in claim 3, wherein the step of determining the target acceleration algorithm corresponding to the target convolution layer, and the target acceleration parameters corresponding to the target acceleration algorithm, according to the acceleration network set, comprises:

if the acceleration network set includes a plurality of acceleration network groups, performing a running test on the preset convolutional neural network in the target hardware equipment by using each of the plurality of acceleration network groups, respectively, to obtain a test time corresponding to each of the plurality of acceleration network groups;

determining a target acceleration network group from the plurality of acceleration network groups, according to the test time, and determining the target acceleration algorithm corresponding to the target convolution layer, and the target acceleration parameters corresponding to the target acceleration algorithm, according to the target acceleration network group; and if the acceleration network set includes an acceleration network group, determining the target acceleration algorithm corresponding to the target convolution layer, and the target acceleration parameters corresponding to the target acceleration algorithm, according to the acceleration network group.

5. The convolution acceleration operation method as claimed in claim 3, wherein the step of determining the candidate acceleration algorithm corresponding to each target convolution layer, and the candidate acceleration parameter corresponding to the candidate acceleration algorithm, according to each shortest running time and the preset threshold, comprises:

obtaining a target running time satisfying preset conditions among the running time of each target convolution layer, each shortest running time and the preset threshold; and determining the preset acceleration algorithm and the acceleration parameters that respectively correspond to each target running time, as the candidate acceleration algorithm corresponding to each target convolution layer, and the candidate acceleration parameters corresponding to the candidate acceleration algorithm.

6. A convolution acceleration operation apparatus applied to an electronic apparatus, the electronic apparatus comprising a processor and a memory and one or more computerized program modules stored in the memory, the one or more computerized program modules comprising instructions performed by the processor of the electronic apparatus, the modules comprising:

a parameter obtaining module performed by the processor and configured to obtain convolution parameters of a target convolution layer and equipment parameters of a target hardware equipment, wherein the target convolution layer is any convolution layer of a preset convolutional neural network, and the preset convolutional neural network is to be operated in the target hardware equipment;

a running time estimation module performed by the processor and configured to pre-estimate a running time of performing convolution operation on the target convolution layer in the target hardware equipment by using each of a plurality of preset acceleration algorithms, according to the convolution parameters and the equipment parameters;

a target acceleration parameter determining module performed by the processor and configured to determine a target acceleration algorithm corresponding to the target convolution layer, and target acceleration parameters corresponding to the target acceleration algorithm, according to the running time; and a convolution acceleration operation module performed by the processor and configured to perform convolution acceleration operation on the target convolution layer by using the target acceleration algorithm and the target acceleration parameters corresponding to the target acceleration algorithm;

wherein the running time estimation module comprises:

a cutting mode determining unit configured to determine a cutting mode corresponding to each of the plurality of preset acceleration algorithms, according to the convolution parameters and each of the plurality of preset acceleration algorithms;

a cutting unit configured to cut the target convolution layer by using the cutting mode corresponding to each of the plurality of preset acceleration algorithms, to obtain a plurality of convolution blocks corresponding to the cutting mode;

a calculation amount determining unit configured to determine a first convolution operation amount and a first data transportation amount of performing convolution operation on each convolution block by using each of the plurality of preset acceleration algorithms, and determine a second convolution operation amount and a second data transportation amount of performing convolution operation on the target convolution layer by using each of the plurality of preset acceleration algorithms, according to the first convolution operation amount and the first data transportation amount;

a calculation intensity determining unit configured to determine calculation intensity of performing convolution operation on the target convolution layer by using each of the plurality of preset acceleration algorithms, according to the second convolution operation amount and the second data transportation amount; and a running time pre-estimating unit configured to determine actual computation power of performing convolution operation in the target hardware equipment by using each of the plurality of preset acceleration algorithms, according to the equipment parameters and the calculation intensity, and pre-estimate the running time of performing convolution operation on the target convolution layer in the target hardware equipment by using each of the plurality of preset acceleration algorithms, according to the actual computation power and the second convolution operation amount.

7. A terminal device comprising a memory, a processor and computer programs stored in the memory and performed by the processor, when the computer programs are performed by the processor, the terminal device is configured to implement a convolution acceleration operation method, the method comprising:

obtaining convolution parameters of a target convolution layer and equipment parameters of a target hardware equipment, wherein the target convolution layer is any convolution layer of a preset convolutional neural network, and the preset convolutional neural network is to be operated in the target hardware equipment;

pre-estimating a running time of performing convolution operation on the target convolution layer in the target hardware equipment by using each of a plurality of preset acceleration algorithms, according to the convolution parameters and the equipment parameters;

determining a target acceleration algorithm corresponding to the target convolution layer and target acceleration parameters corresponding to the target acceleration algorithm, according to the running time; and performing convolution acceleration operation on the target convolution layer by using the target acceleration algorithm and the target acceleration parameters corresponding to the target acceleration algorithm;

wherein the step of pre-estimating the running time of performing convolution operation on the target convolution layer in the target hardware equipment by using each of the plurality of preset acceleration algorithms, according to the convolution parameters and the equipment parameters, comprises:

determining a cutting mode corresponding to each of the plurality of preset acceleration algorithms, according to the convolution parameters and each of the plurality of preset acceleration algorithms;

cutting the target convolution layer by using the cutting mode corresponding to each of the plurality of preset acceleration algorithms, to obtain a plurality of convolution blocks corresponding to the cutting mode;

determining a first convolution operation amount and a first data transportation amount of performing convolution operation on each convolution block by using each of the plurality of preset acceleration algorithms, and determining a second convolution operation amount and a second data transportation amount of performing convolution operation on the target convolution layer by using each of the plurality of preset acceleration algorithms, according to the first convolution operation amount and the first data transportation amount;

determining calculation intensity of performing convolution operation on the target convolution layer by using each of the plurality of preset acceleration algorithms, according to the second convolution operation amount and the second data transportation amount; and determining actual computation power of performing convolution operation in the target hardware equipment by using each of the plurality of preset acceleration algorithms, according to the equipment parameters and the calculation intensity, and pre-estimating the running time of performing convolution operation on the target convolution layer in the target hardware equipment by using each of the plurality of preset acceleration algorithms, according to the actual computation power and the second convolution operation amount.

* * * * *